United States Patent [19]
Barnes et al.

[11] Patent Number: 6,007,894
[45] Date of Patent: Dec. 28, 1999

[54] QUASI-ISOTROPIC COMPOSITE ISOGRID STRUCTURE AND METHOD OF MAKING SAME

[75] Inventors: Donald Charles Barnes, Huntsville; Stephen Mark Kusek, Owens Cross Roads; Dennis Anthony Lascola, Toney, all of Ala.

[73] Assignee: McDonnell Dougal Corporation, Huntington Beach, Calif.

[21] Appl. No.: 08/890,844

[22] Filed: Jul. 10, 1997

[51] Int. Cl.$^6$ .................................. B32B 7/00; B27N 3/10
[52] U.S. Cl. ..................... 428/120; 428/113; 428/167; 428/172; 264/257; 264/258; 156/169; 156/184
[58] Field of Search ................................. 428/167, 120, 428/172, 113, 114, 166, 175, 178; 156/181, 169, 184, 229; 264/257, 258, 241

[56] References Cited

U.S. PATENT DOCUMENTS

| | | |
|---|---|---|
| 2,999,780 | 9/1961 | Perrault . |
| 3,075,249 | 1/1963 | Sucher . |
| 3,088,174 | 5/1963 | Kolt . |
| 3,093,160 | 6/1963 | Boggs . |
| 3,341,395 | 9/1967 | Weber . |
| 3,349,157 | 10/1967 | Parsons . |
| 3,645,833 | 2/1972 | Figge . |
| 3,779,851 | 12/1973 | Hertz . |
| 3,790,432 | 2/1974 | Fletcher et al. . |
| 3,817,806 | 6/1974 | Anderson et al. . |
| 3,940,891 | 3/1976 | Slysh . |
| 3,958,055 | 5/1976 | Hadley et al. . |
| 3,996,084 | 12/1976 | Holmes . |
| 3,999,998 | 12/1976 | Carbonnel et al. . |
| 4,012,549 | 3/1977 | Slysh . |
| 4,015,653 | 4/1977 | Slysh et al. . |
| 4,040,333 | 8/1977 | Slysh . |
| 4,051,289 | 9/1977 | Adamson . |
| 4,056,309 | 11/1977 | Harbison et al. . |
| 4,086,378 | 4/1978 | Kam et al. . |

(List continued on next page.)

OTHER PUBLICATIONS

8552 Composite Systems, Jan. 1993, pp. 1–37.
Handbook of Composites, 18 Fabrication of Advanced Composites*, L.E. "Roy" Meade, prior to Jul. 10, 1997, pp. 491–492.
Engineered Materials Handbook, vol. 1, Composites, 1987, "Epoxy Resins", Clayton A. May, pp. 66–77.
Engineered Materials Handbook, vol. 1, Composites, 1987, "Prepreg Resins", William T. McCarvill, pp. 139–156.
Engineered Materials Handbook, vol. 1, Composites, 1987, "Wet Lay–Up Resins", William T. McCarvill, pp. 132–134.
Engineered Materials Handbook, vol. 1, Composites, 1987, "Design/Tooling/Manufacturing Interfaces", Brian A. Wilson, pp. 428–431.
Engineered Materials Handbook, vol. 1, Composites, 1987, Instability Considerations, Arthur W. Leissa, pp. 445–449.
Engineered Materials Handbook, vol. 1, Composites, 1987, "Compression Molding", Carl F. Johnson pp. 559–563.
Engineered Materials Handbook, vol. 1, Composites, 1987, "Manufacturing Processes: Aerospace", Hans Borstell, pp. 575–614.
Engineered Materials Handbook, vol. 1, Composites, 1987, "Flat Tape Laying", Paul F. Pirrung, pp. 624–635.
Engineered Materials Handbook, vol. 1, Composites, 1987, Preparation for Cure, Timothy W. McGann and Eugene R. Crilly, pp. 642–648.
Engineered Materials Handbook, vol. 1, Composites, 1987, Curing Epoxy Resins, David J. Boll and John C. Weidner, pp. 654–663.
Engineered Materials Handbook, vol. 1, Composites, 1987, Aircraft Applications, Jeanne M. Anglin, pp. 801–822.
Engineered Materials Handbook, vol. 1, Composites, 1987, Marine Applications, John Summerscales, pp. 837–844.

*Primary Examiner*—Donald Loney
*Attorney, Agent, or Firm*—Harness Dickey & Pierce P.L.L.C.

[57] ABSTRACT

A quasi-isotropic composite structure includes a multi-sheet rib projecting generally perpendicular to a multi-sheet body with at least one of the body face sheets being bent and attached in a parallel manner to the rib sheet or sheets. The sheet or sheets that are part of both the body and rib are unsevered and integrally contiguous.

12 Claims, 13 Drawing Sheets

U.S. PATENT DOCUMENTS

| | | |
|---|---|---|
| 4,116,258 | 9/1978 | Slysh et al. . |
| 4,151,872 | 5/1979 | Slysh et al. . |
| 4,165,355 | 8/1979 | Vasilos . |
| 4,177,306 | 12/1979 | Schulz et al. . |
| 4,284,679 | 8/1981 | Blad et al. . |
| 4,308,699 | 1/1982 | Slysh . |
| 4,443,059 | 4/1984 | Wells . |
| 4,464,429 | 8/1984 | Michaud-Soret . |
| 4,575,029 | 3/1986 | Harwood et al. . |
| 4,584,226 | 4/1986 | Vitale et al. . |
| 4,598,007 | 7/1986 | Kourtides et al. . |
| 4,622,254 | 11/1986 | Nishimura et al. . |
| 4,635,071 | 1/1987 | Gounder et al. . |
| 4,636,422 | 1/1987 | Harris et al. . |
| 4,683,018 | 7/1987 | Sutcliffe et al. . |
| 4,711,398 | 12/1987 | Ganderton et al. . |
| 4,715,560 | 12/1987 | Loyek . |
| 4,786,541 | 11/1988 | Nishimura et al. . |
| 4,803,108 | 2/1989 | Leuchten et al. . |
| 4,822,660 | 4/1989 | Lipp . |
| 4,888,247 | 12/1989 | Zweben et al. . |
| 4,943,014 | 7/1990 | Harwood et al. . |
| 5,115,655 | 5/1992 | Martin et al. . |
| 5,122,242 | 6/1992 | Slysh . |
| 5,170,967 | 12/1992 | Hamamoto et al. . |
| 5,200,251 | 4/1993 | Brand . |
| 5,223,067 | 6/1993 | Hamamoto et al. . |
| 5,229,184 | 7/1993 | Campbell et al. . |
| 5,242,523 | 9/1993 | Willden et al. . |
| 5,279,092 | 1/1994 | Williamsen et al. . |
| 5,333,003 | 7/1994 | Archer . |
| 5,362,347 | 11/1994 | Domine . |
| 5,409,349 | 4/1995 | Kulak et al. . |
| 5,409,775 | 4/1995 | Harada et al. . |
| 5,413,456 | 5/1995 | Kulak et al. . |
| 5,443,884 | 8/1995 | Luisgnea et al. . |
| 5,462,791 | 10/1995 | Kashima et al. . |
| 5,482,429 | 1/1996 | Penda . |
| 5,485,723 | 1/1996 | McCoy et al. . |
| 5,516,257 | 5/1996 | Kasprow et al. . |
| 5,536,541 | 7/1996 | Armellini . |
| 5,554,430 | 9/1996 | Pollatta et al. . |
| 5,596,870 | 1/1997 | Dillard et al. . |
| 5,620,652 | 4/1997 | Tack et al. . |
| 5,622,733 | 4/1997 | Asher . |

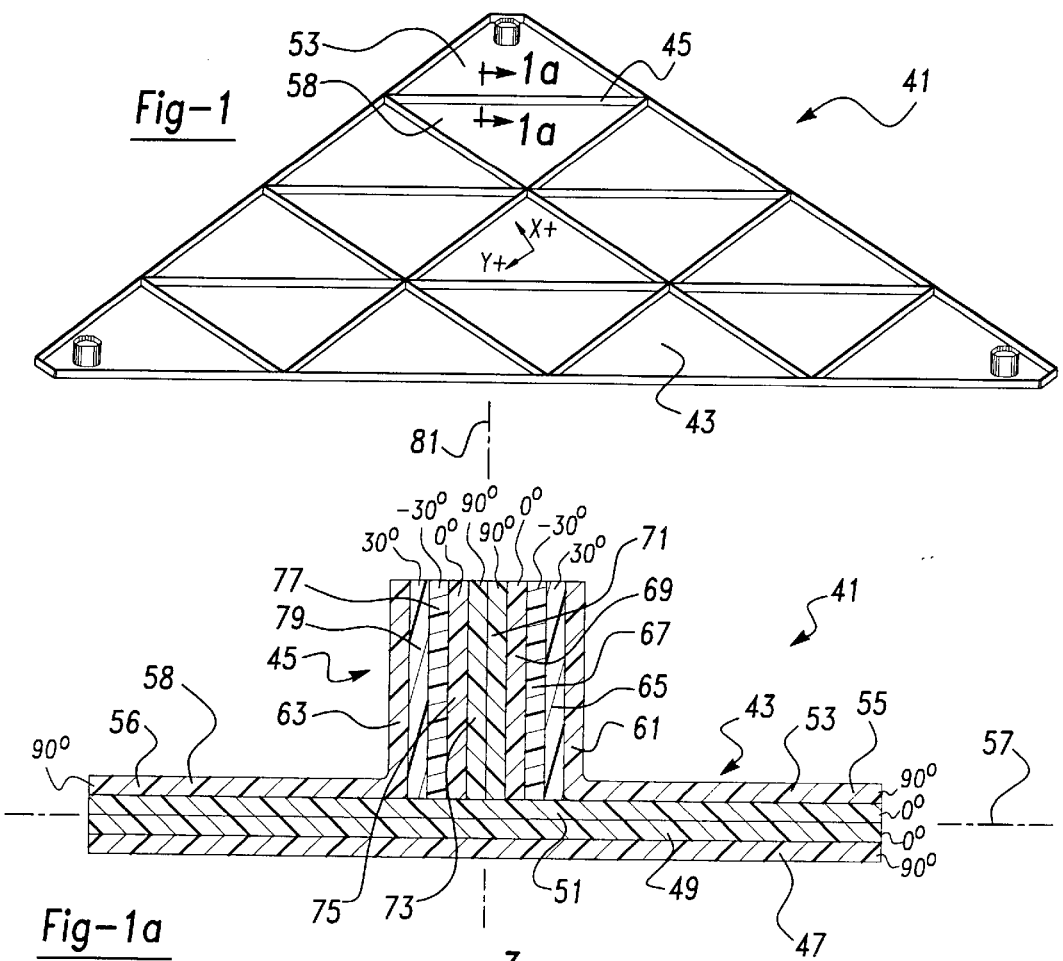
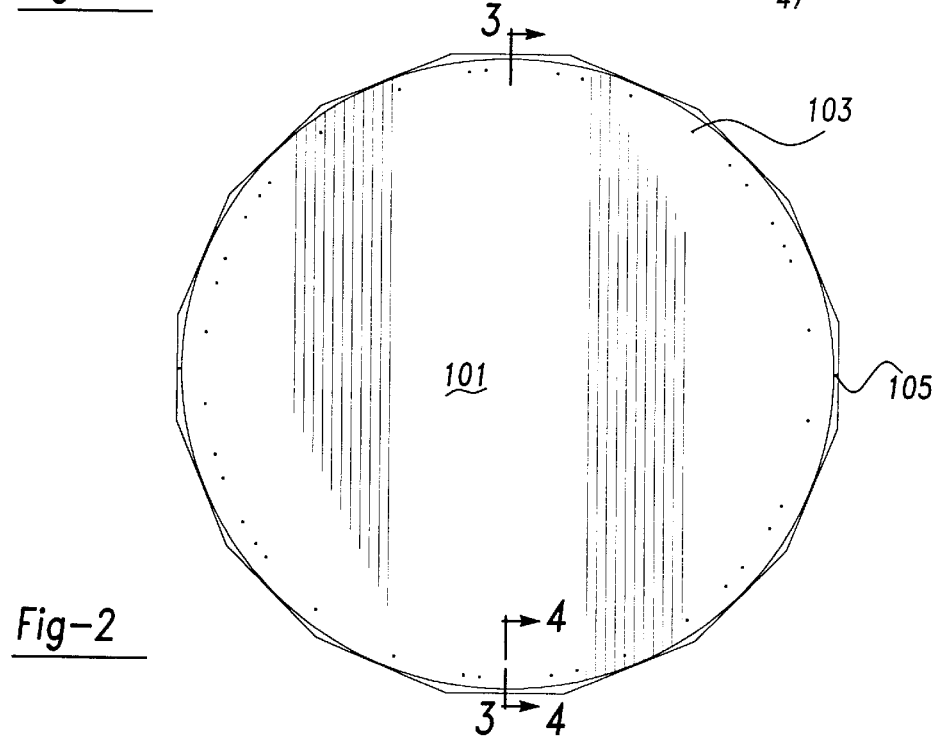

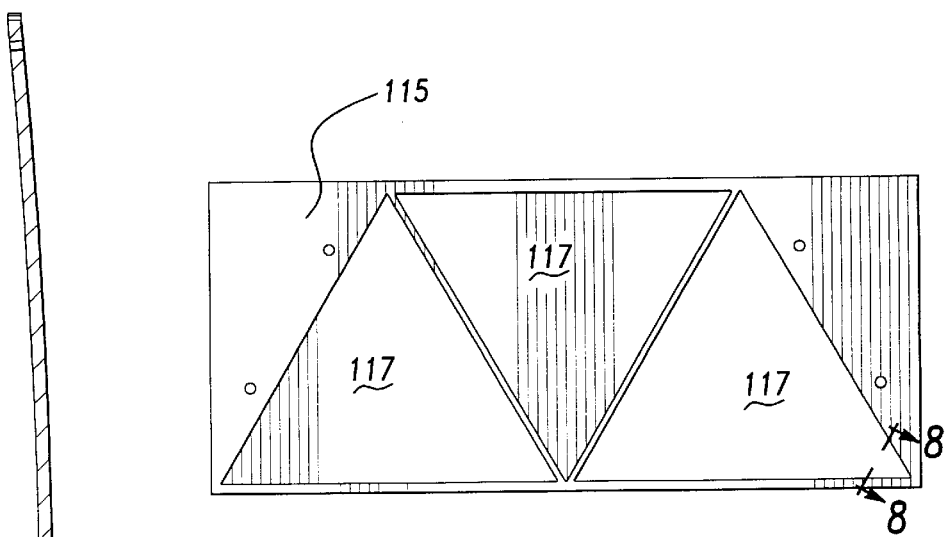
Fig-7
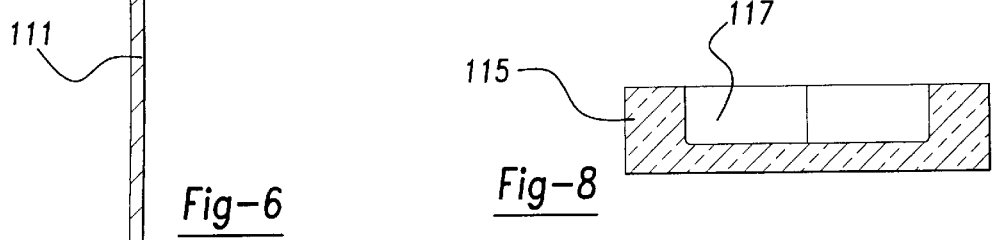
Fig-8
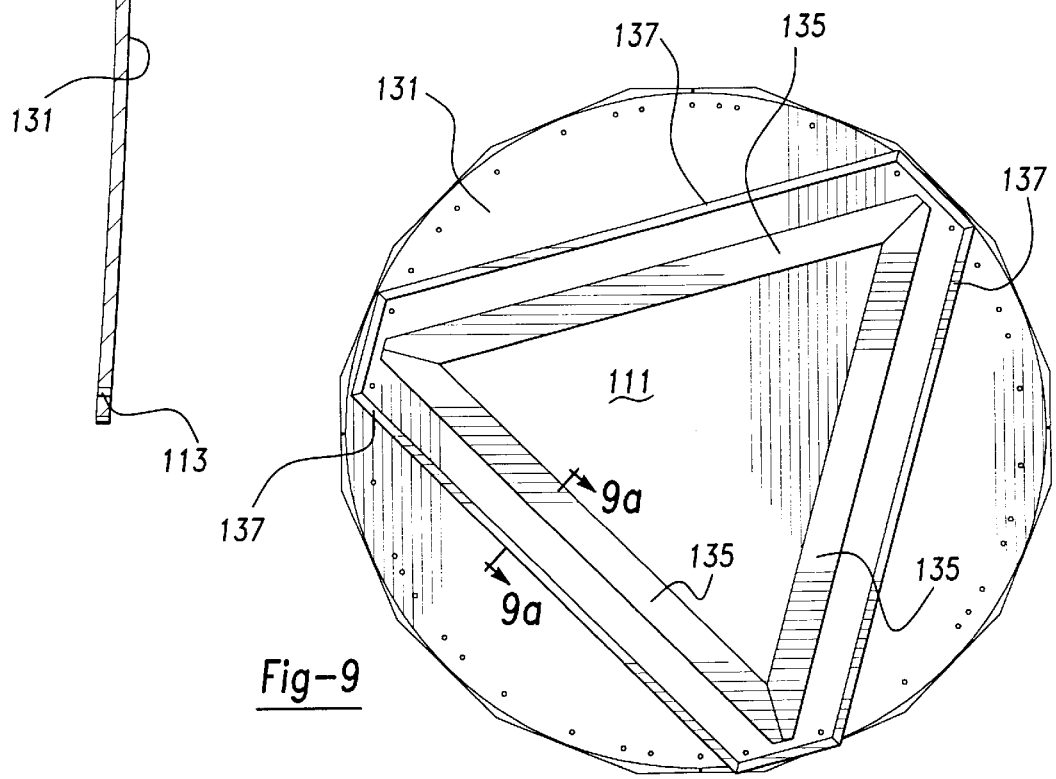
Fig-6
Fig-9

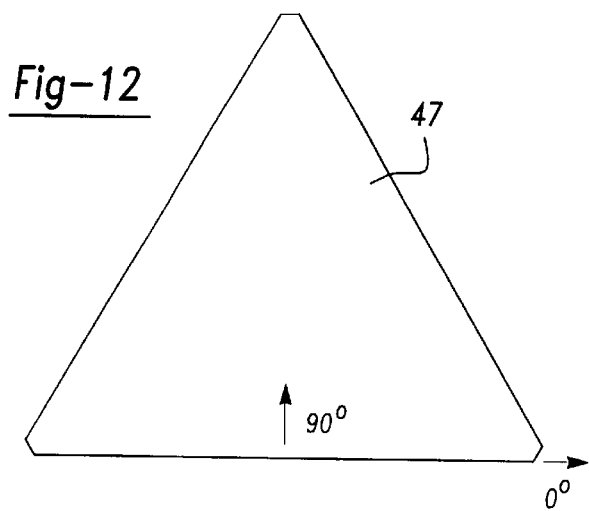
Fig-12
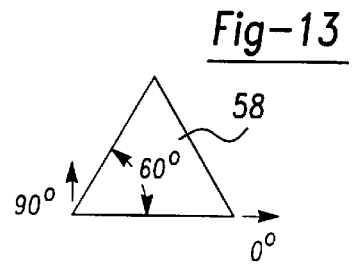
Fig-13
Fig-14
Fig-15
Fig-16
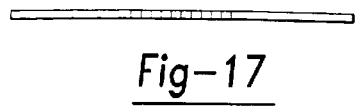
Fig-17
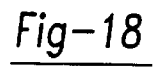
Fig-18

| ISUS FACET COUPON DEVELOPMENT CURE CYCLE ||||
|---|---|---|
| TIME (hr) | TIMELINE (hr) | TEMPERATURE (deg C) |
| 0 | 0 | 20 |
| 2 | 2 | 50 |
| 8 | 10 | 50 |
| 7 | 17 | 100 |
| 1 | 18 | 100 |
| 1 | 19 | 180 |
| 4 | 23 | 180 |
| 1 | 24 | 20 |
| 24 | ← TOTAL # HOURS ||

QUASI-ISOTROPIC COMPOSITE ISOGRID STRUCTURE AND METHOD OF MAKING SAME

The Government has rights in this invention pursuant to Contract No. F29601-95-C-0228 awarded by the U.S. Department of the Air Force. The invention described herein may be manufactured and used by or for the Government for governmental purposes without the payment of any royalty thereon.

BACKGROUND OF THE INVENTION

1. Technical Field

This invention relates generally to composite structures and more specifically to a quasi-isotropic composite structure and method of making same.

2. Background Art

It is well known to make composite structures from woven materials, such as graphite or fiberglass threads or fibers, which are then bonded in a hard resin-like matrix to form a tough, high strength and lightweight member. An intrinsic property of these composite materials is that they expand and contract in different amounts depending on the orientation of the fibers since the coefficients of thermal expansion typically differ in the longitudinal and transverse directions. Consequently, when structures are made of these types of composite materials and then subjected to great variations in temperature, these traditional structures may tend to deform by warping and buckling. Such deformations might induce undesirable high internal stresses, especially if the structures are constrained. Furthermore, such part deformations are traditionally minimized by making the structure undesirably larger and heavier, thereby increasing raw material and manufacturing costs.

It is also known to employ composite isogrid structures made from layers of composite sheets which are formed into very thick graphite and epoxy flat stock. This flat stock is then milled into an isogrid configuration. However, this approach is costly since the high cost composite material is wasted in the milled out areas and since the machining process is very time-consuming and costly. Often, over 90% of the composite material is scrapped in this milling process.

Less efficient alternatives to an isogrid configuration have also been tried. For example, foam core or honeycomb structures have been used but may suffer from reduced heat transfer through the structure. These approaches also exhibit strength variations throughout the part. Other traditional constructions have attempted to adhere separate ribs onto composite isogrid structures, but with limited success. Structures having adhered ribs are known to have separation of the ribs from the face sheets.

Further examples of conventional composite structures are disclosed in the following U.S. Pat. Nos.: U.S. Pat. No. 5,554,430 entitled "Low CTE Boron/Carbon Fiber Laminate" which issued to Pollatta et al. on Sep. 10, 1996; U.S. Pat. No. 5,333,003 entitled "Laminated Composite Shell Structure having Improved Thermoplastic Properties and Method for its Fabrication" which issued to Archer on Jul. 26, 1994; U.S. Pat. No. 4,635,071 entitled "Electromagnetic Radiation Reflector Structure" which issued to Gounder et al. on Jan. 6, 1987; and U.S. Pat. No. 4,177,306 entitled "Laminated Sectional Girder of Fiber-Reinforced Materials" which issued to Schulz et al. on Dec. 4, 1979.

Autoclave molding is most commonly used during the curing of lay-up composites in order to provide high pressures to form dense parts; see, for example, U.S. Pat. No. 5,622,733 entitled "Tooling for the Fabrication of Composite Hollow Crown-Stiffened Skins and Panels" which issued to Asher on Apr. 22, 1997. A vacuum is often used to assist in the removal of trapped air or the like during the autoclave process. However, autoclave machines are very expensive to purchase and operate, especially for the manufacturer of low volume prototypes or production.

It is also known to provide other types of traditional composite isogrid members. For example, U.S. Pat. No. 4,086,378 entitled "Stiffened Composite Structural Member and Method of Fabrication" which issued to Kam et al. on Apr. 25, 1978, and U.S. Pat. No. 4,012,549 entitled "High Strength Composite Structure" which issued to Slysh on Mar. 15, 1977, disclose flanges or ribs disposed on composite structures.

3. Disclosure of Invention

In accordance with the present invention, an embodiment of a quasiisotropic composite structure includes a multi-sheet rib projecting generally perpendicular to a multi-sheet body with at least one of the body face sheets being bent and attached in a parallel manner to the rib sheet or sheets. A further aspect of the present invention provides that the sheet or sheets that are part of both the body and rib are unsevered and integrally contiguous. In another aspect of the present invention, each of the body sheets are made of composite material having generally unidirectional fibers. In yet another aspect of the present invention, each of the rib sheets are made of composite material having generally unidirectional fibers. The unidirectional fibers and sheets are oriented in an offset manner in relation to some of the other parallel stacked fibers and sheets so as to achieve the quasi-isotropic properties of the structure. Methods of making the composite structure of the present invention are also provided.

The quasi-isotropic composite structure of the present invention is highly advantageous over prior constructions since the present invention employs at least one common composite sheet for both an isogrid body and rib. This provides for superior strength, more uniform thermal expansion and superior securement of the rib to the body. This advantage is further heightened when a single contiguous and integral sheet is employed as part of two or more adjacent ribs and the body spanning therebetween. The present invention structure is also advantageous since it can be formed into a flat or curved isogrid structure. A curved isogrid structure additionally enhances the load bearing ability, especially as compared to traditional flat or even I-beam-type shapes, while allowing for a surface opposite the ribs to be free of ribs or other interruptions for receiving a mirrored coating or for providing a more aerodynamic shape.

The isogrid construction of the present invention is also more strength and weight efficient than would be traditional skin and stringer, milled or add-on rib configurations. The quasi-isotropic composite isogrid structure of the present invention is ideally suited for spacecraft, launch vehicles and aircraft where the significant weight savings of the present invention allow more payload to be delivered into orbit or improved fuel efficiency. The present invention structure and manufacturing method provide a generally non-deforming part that will retain its shape under a wide variety of temperature variations, including cryogenic temperatures, an the present invention apparatus is especially suited for use in constrained structures where the stresses induced by temperature variations will be exceptionally low as compared to conventional products and processes.

The method of manufacturing the present invention offers further advantages by allowing for low cost compression and curing of the composite structure in a simple oven rather than in a traditionally more expensive autoclave. Such a low cost manufacturing process is achieved by the use of blocks which have a differing thermal expansion rate as compared to a tool disposed on the opposite side of the composite structure, whereby the partially constrained blocks expand greater than the tool a nd compresses the adjacent portion s of the structure against the tool and/or each other when heated in the oven. Additional advantages and features of the present invention will become apparent from the following description and appended claims, taken in conjunction with the accompanying drawings.

4. BRIEF DESCRIPTION OF DRAWINGS

FIG. 1 is a perspective view showing a quasi-isotropic composite isogrid structure of the present invention;

FIG. 1a is a cross sectional view, taken along line 1a—1a of FIG. 1, showing the quasi-isotropic composite isogrid structure;

FIG. 2 is a top elevational view showing a master surface tool used for making the quasi-isotropic composite isogrid structure ;

FIG. 6 is a cross sectional view, taken along line 6—6 if FIG. 5, showing the lay-up tool;

FIG. 7 is a top elevational view showing a block mold used for making the quasi-isotropic composite isogrid structure;

FIG. 8 is a cross sectional view, taken along line 8—8 of FIG. 7, showing the block mold;

FIG. 9 is a top elevational view showing edge dam molds placed on the lay-up tool used for making the quasi-isotropic composite isogrid structure;

FIG. 12 is a top elevational view showing a face sheet employed in the quasi-isotropic composite isogrid structure;

FIG. 13 is a top elevational view showing an isogrid cell layer employed in the quasi-isotropic composite isogrid structure;

FIG. 14 is a side elevational view showing the rib sheets G, J and M employed in the quasi-isotropic composite isogrid structure;

FIG. 15 is a side elevational view showing rib sheets A, C and E employed in the quasi-isotropic composite isogrid structure;

FIG. 16 is a side elevational view showing rib sheets H, K and N employed in the quasi-isotropic composite isogrid structure;

FIG. 17 is a side elevational view showing rib sheets I, L and O employed in the quasi-isotropic composite isogrid structure;

FIG. 18 is a side elevational view showing rib sheets B, D and F employed in the quasi-isotropic composite isogrid structure;

5. DETAILED DESCRIPTION OF THE INVENTION

Figure 3:
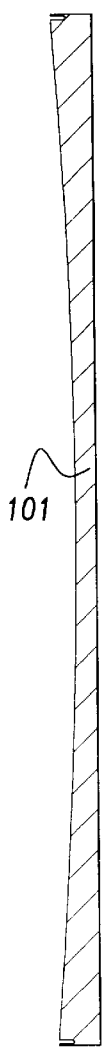
FIG. 3 is a cross sectional view, taken along line 3—3 of FIG. 2, showing the master surface tool.

FIGS. 1 and 1a show an embodiment of a quasi-isotropic composite isogrid structure 41 used as part of an integrated solar-powered upper stage mirror facet. The structure 41 has a body 43 and ribs 45. The body 43 and the ribs 45 are all made from multiple sheets or plies of a reinforced plastic composite tape such as, without limitation, a pre-pregnated or pre-preg epoxy and unidirectional graphite fiber, composite tape. An example of one such composite tape that has been found to be suitable is IM7/8552, which can be obtained from Hercules Co.

More specifically, the body 43 has a bottom face sheet 47 with its fibers oriented at a suitable angle such as approximately in a 90 degree direction. The body 43 further contains second and third intermediate face sheets 49 and 51, respectively, with their fibers oriented in approximately a zero degree direction relative to the bottom face sheet 47. A body portion 55 of an opposite, top outer sheet 53 of body 43 also has its fibers oriented at a suitable angle such as approximately in a 90 degree direction. A body portion 56 of another top, outer body sheet 58 is also stacked on top of the intermediate body sheet 51 and has its fibers oriented at a suitable angle such as approximately in a 90 degree direction. The body sheets 47, 49, 51 and the body portion 55 of the sheet 53, are all elongated and parallel in a length or sheeting direction 57, which in one embodiment is partially spherical or toroidal but may also be flat, cylindrical or have an irregular shape.

The rib 45 includes a rib portion 61 of the body sheet 53 and an opposite but parallel rib portion 63 of the body sheet 58. The rib 45 further has multiple intermediate sheets 65, 67, 69, 71, 73, 75, 77 and 79 elongated in a length or sheeting direction 81 projecting generally perpendicular to the length direction 57 of the body 43. Cut ends of each intermediate rib sheet abut against an outside surface of the intermediate body sheet 51. The fibers of the intermediate rib sheets 65 and 79 are oriented at an approximately 30 degree angle, the intermediate rib sheets 67 and 77 have an approximately minus 30 degree angle to their fibers, the intermediate rib sheets 69 and 75 have their fibers oriented at approximately 0 degrees, while the innermost intermediate rib sheets 71 and 73 have their unidirectional fibers disposed at approximately 90 degree angles relative to the other rib sheets.

Figure 25:
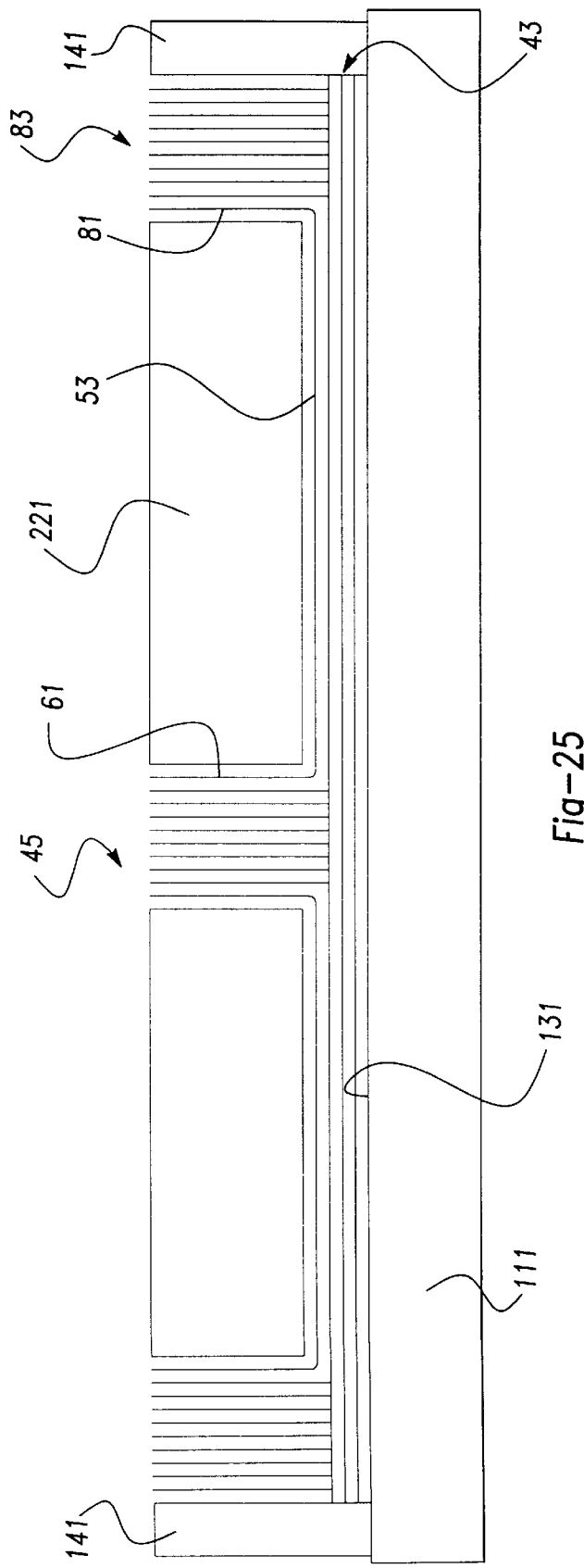
FIG. 25 is a diagrammatic cross sectional view showing the relationship of the blocks, quasi-isotropic composite isogrid structure and lay-up tool.
Figure 26:
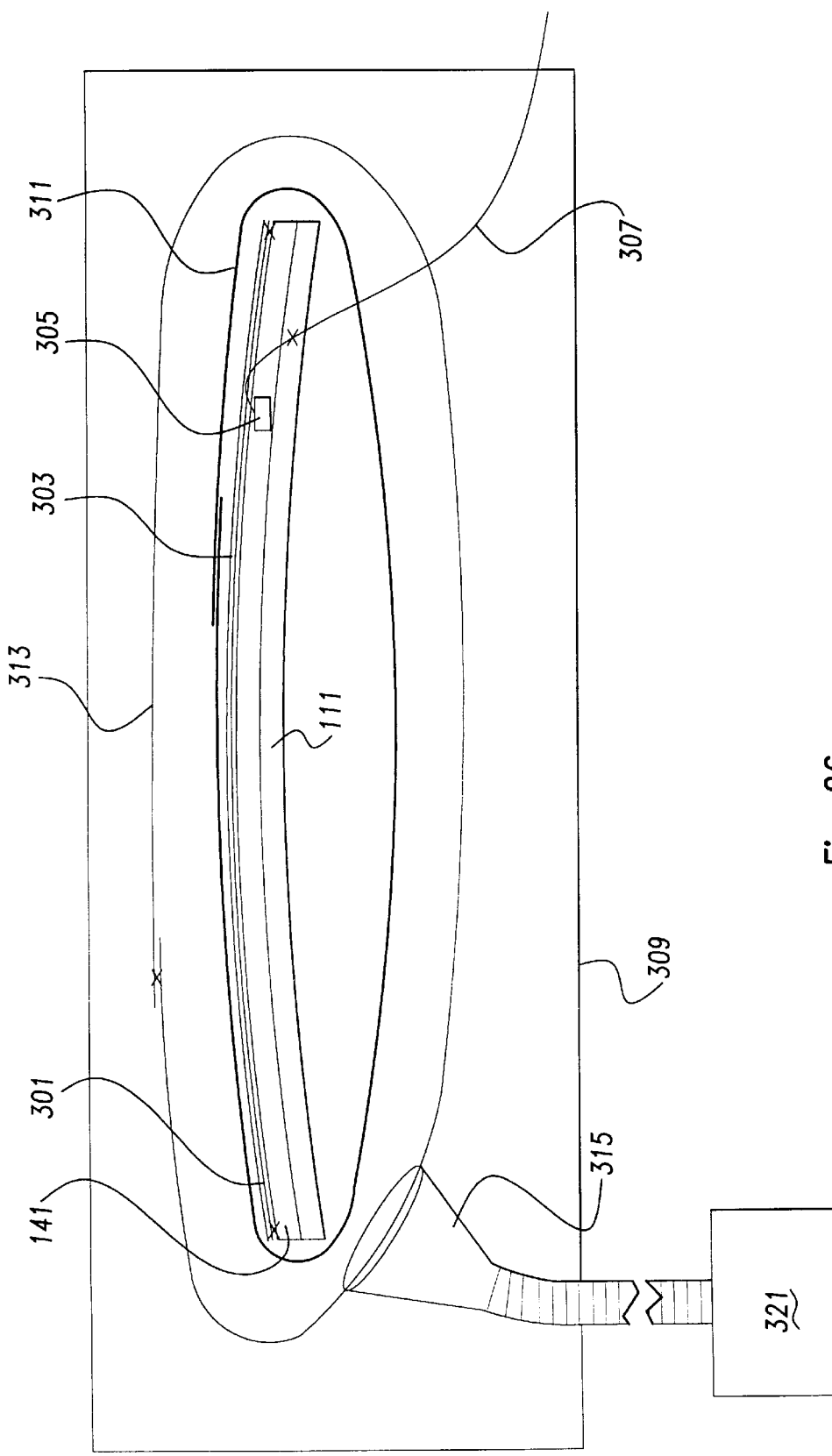
FIG. 26 is a diagrammatic cross sectional view showing the quasi-isotropic composite isogrid structure and lay-up tool disposed in an oven.
Figures 27, 28:
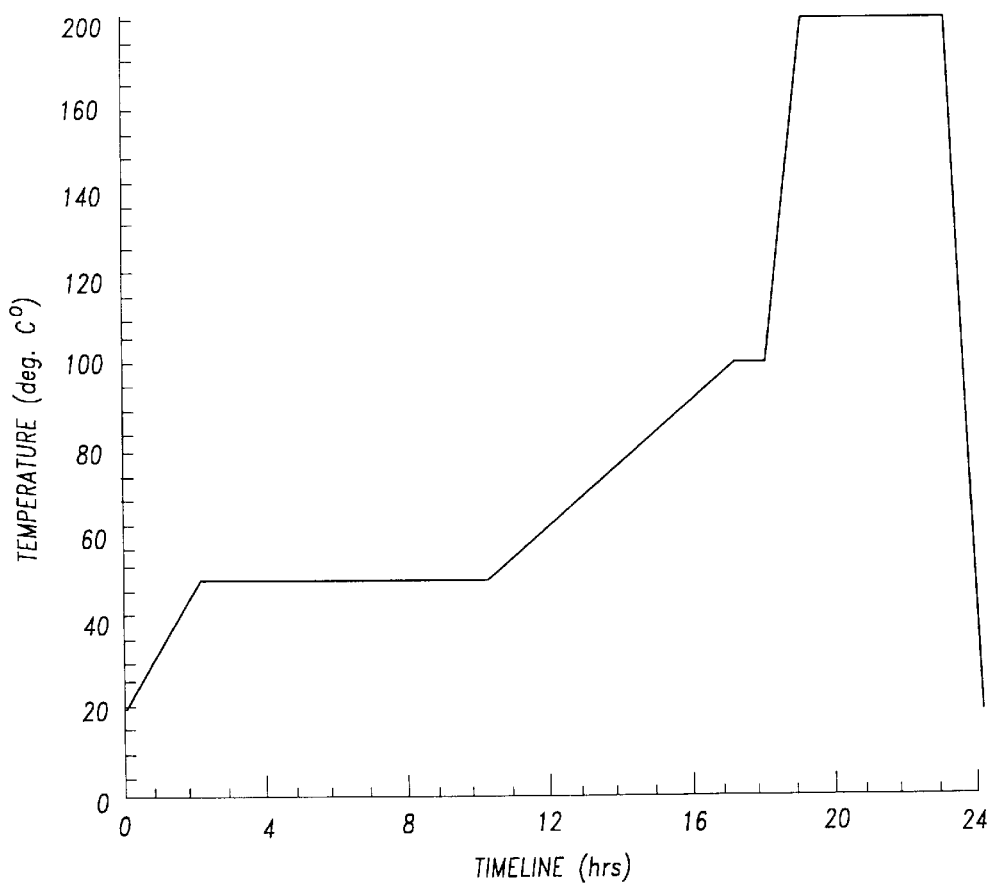
FIG. 27 is a table showing an exemplary oven cure cycle used for making the quasi-isotropic composite isogrid structure.
FIG. 28 is a graph showing the exemplary oven cure cycle used for making the quasi-isotropic composite isogrid structure.
Figure 29:
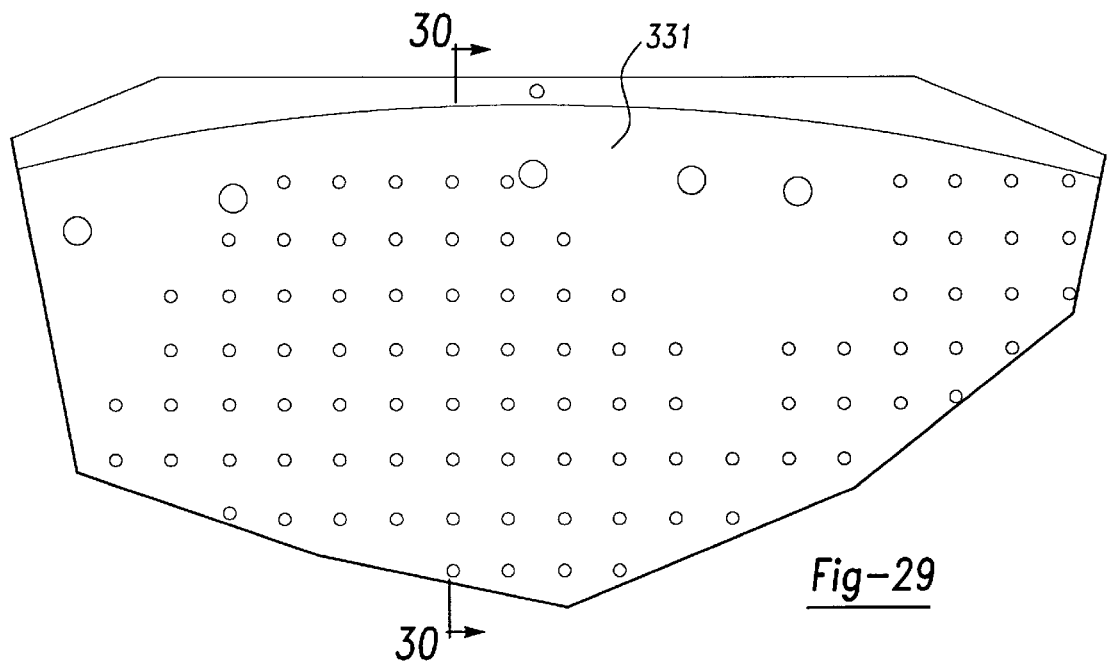
FIG. 29 is a fragmentary top elevational view showing a vacuum table used for making the quasi-isotropic composite isogrid structure.
Figure 30:
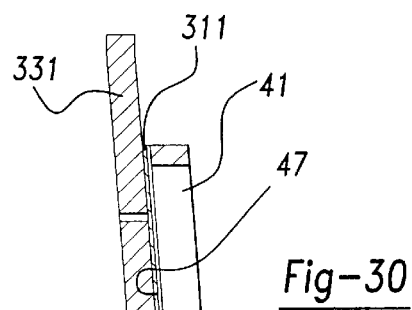
FIG. 30 is a cross sectional view, taken along line 30—30 of FIG. 29, showing the quasi-isotropic composite isogrid structure and a mirror plating placed on the vacuum table.
Figure 31:
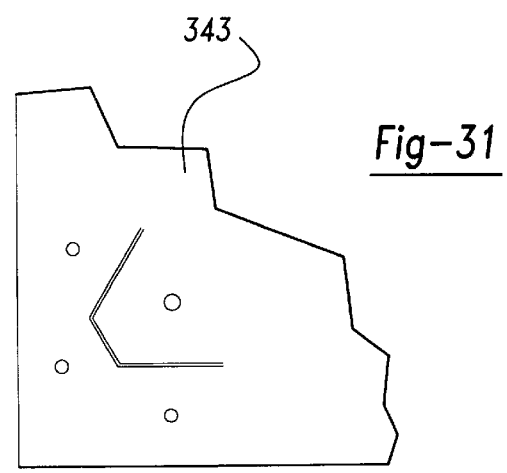
FIG. 31 is a fragmentary top elevational view showing a capture cup bonding fixture used for making the quasi-isotropic composite isogrid structure.
Figure 32:
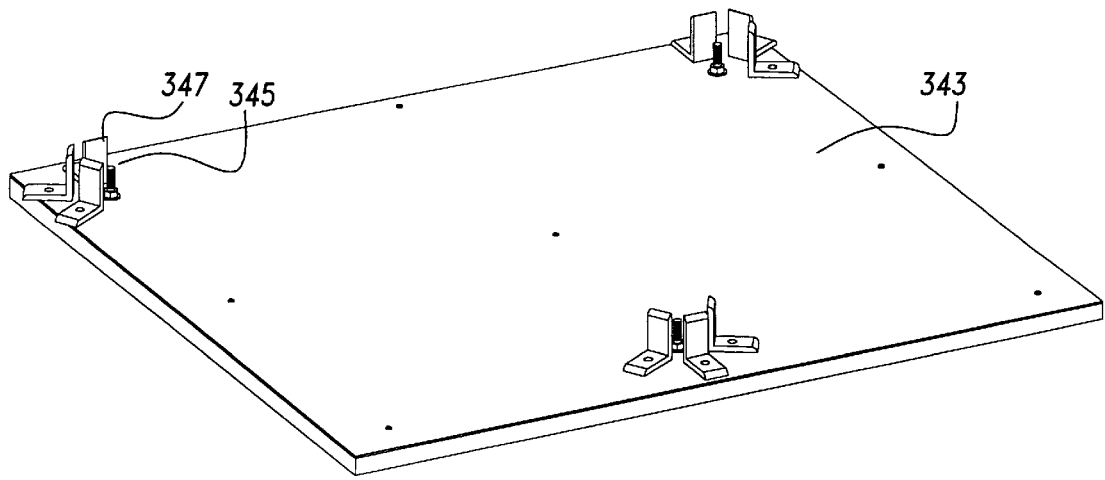
FIG. 32 is a perspective view showing the capture cup bonding fixture.
Figure 33:
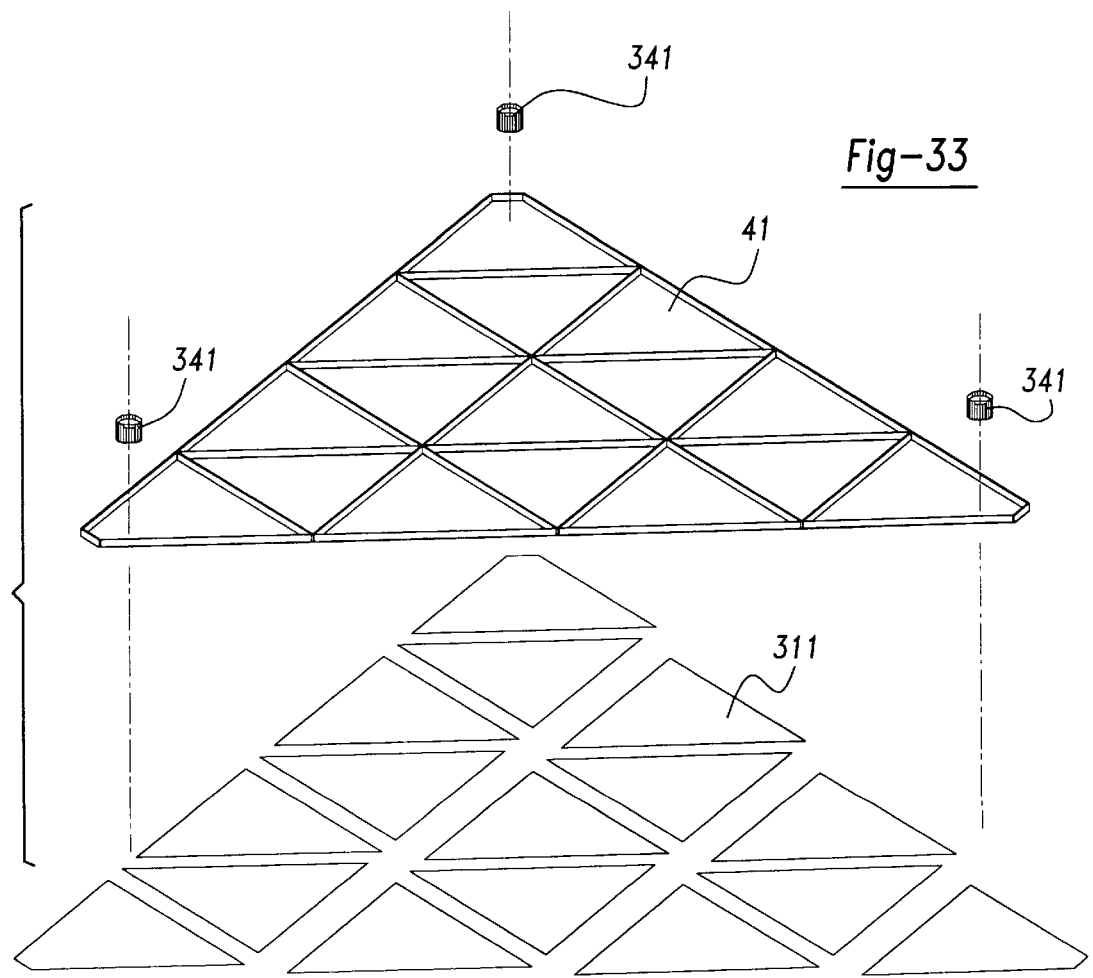
FIG. 33 is an exploded perspective view showing the quasi-isotropic composite isogrid structure, with mirror plating and capture cups.

The body sheets 53 and 58 are laid with their rib portions 61 and 63 bent in a continuous and unsevered, single piece manner so as to also define the outer parallel sheets of the rib 45. This provides superior dimensional and thermal stability between the rib and body while also preventing undesired separation of the rib and body during use. As with the other top body sheets, an opposite rib portion 81 of the sheet 53 projects parallel to the rib portion 61 to form another upstanding rib 83, as is shown in FIG. 25; thus, the sheet 53 has a generally U-shaped configuration. Therefore, the structure 41 creates a quasi-isotropic composite isogrid structure through the use of differing directional fiber orientations between the stacked sheet layers. It is also envisioned that multiple stacked body sheets may also be bent to form continuous rib and body portions to further reinforce and join the rib to the body.

Figure 4:
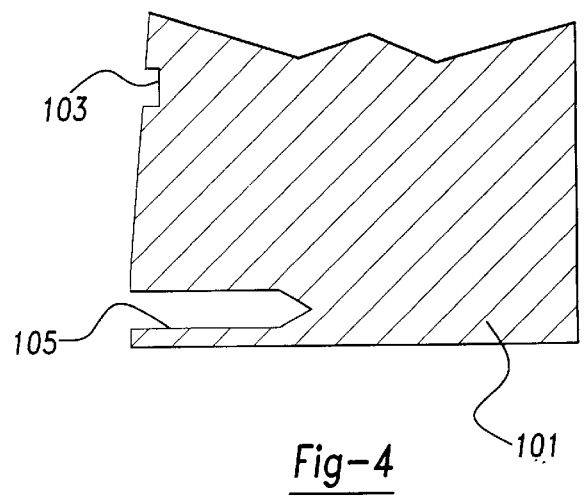
FIG. 4 is a fragmentary and enlarged cross sectional view, taken along line 4—4 of FIG. 2, showing the master surface tool.

The method and tools used to manufacture the quasi-isotropic composite isogrid structure of the present invention will now be described in detail. FIGS. 2–4 show a master surface tool 101 which is machined from a suitable material, such as 6061-T6 aluminum. In one embodiment, forty-two blind approximately 0.125 inch diameter holes 103 are disposed in a circular manner around the master surface tool 101 and four deeper blind holes 105 are end milled adjacent to a periphery of the master surface tool 101. The center of the master surface tool 101 has a toroidal shape and the outer periphery is a sixteen sided, irregular polygon.

Figure 5:
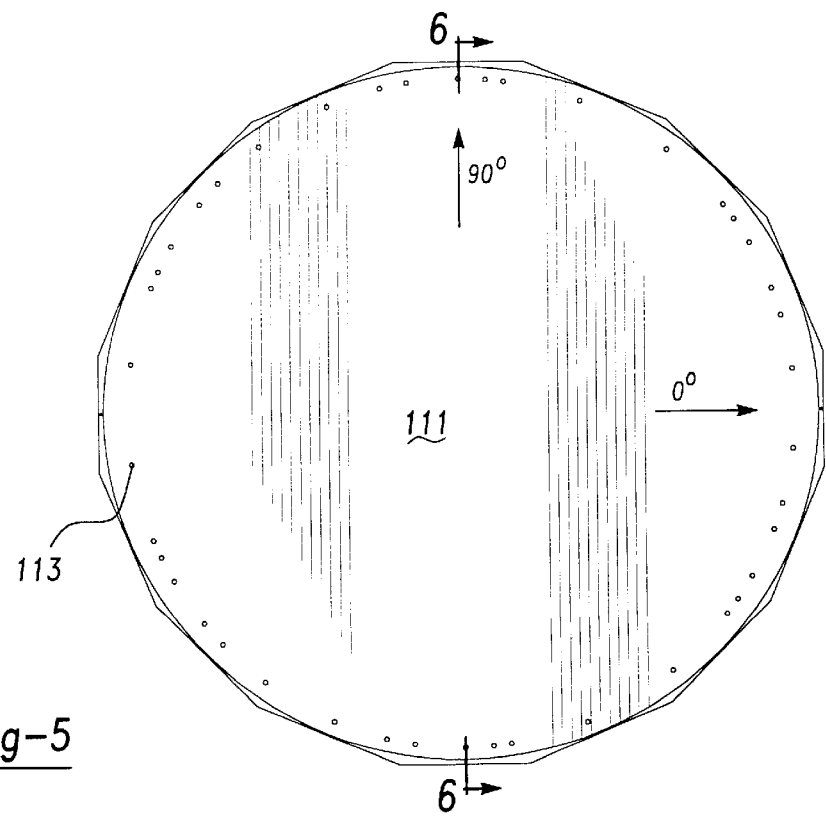
FIG. 5 is a top elevational view showing a lay-up tool used for making the quasi-isotropic composite isogrid structure.

FIGS. 5 and 6 illustrate a lay up or laminating tool 111 which is hand laid up from a carbon fiber cloth and epoxy composite material on the master surface tool 101. Therefore, the lay up tool 111 has a domed shape corresponding to the toroidal master surface tool shape. The holes 103 and 105 of the master surface tool 101 (see FIG. 2) serve to create projecting nodules in the lay up tool 111 which are drilled out for the holes 113. Zero and 90 degree directions are used as reference orientations for continued sheet lay up work on the lay up tool 111 throughout the subsequent part forming steps.

Referring to FIGS. 7 and 8, a block mold 115 is machined from a suitable material, such as 6061-T6 aluminum and has three block mold cavities 117 of a generally triangular nature. Silicone rubber blocks, preferably silicone rubber type RTV630 which can be purchased from General Electric, are formed into triangular shapes in the mold 115. Truncated-triangular block mold cavities (not shown) are also needed.

The edge dam molding operation can be observed with reference to FIGS. 6 and 9–11. First, the work surface 131 of the lay up tool 111 is cleaned with alcohol and then coated with a mold release agent, such as a water based mold release agent (e.g., "Safe Release 30") using cheesecloth. This mold release agent is allowed to dry for a suitable time such as about 30 minutes and then a second coating is applied with a wiping direction approximately 90 degrees from that used for the first coat. After drying (e.g., for another 30 minutes in the above embodiment), three alignment aids 133 are bolted to the corresponding holes 113 of the lay up tool 111. These three alignment aids are equilaterally reoriented as needed for additional facets.

Templates are used to cut dam molds. Six inner dam molds 135, stacked two for each side, are then placed and retained on the lay up tool 111 by a tape having a temperature rating of about 425 degrees Fahrenheit. Twelve outer dam molds 137 are also retained on the lay up tool 111 in a manner similar to that with the inner dam molds 135. Alignment aids 133 are then removed. Three layers of an approximately 5.7 ounce, 11 mil thick, plain weave carbon fiber fabric and graphite filled epoxy face coat are first laid between the inner and outer dam molds 135 and 137. The fourth through thirteenth layers of about 10.1 ounce, 17 mil thick plain weave carbon fiber fabric and graphite filled epoxy face coat sheets are then laid upon the first three layers. The entire assembly is then vacuum bagged for room temperature curing of the edge dams. The inner edge dam molds 135 and outer edge dam molds 137 are next removed for the final elevated temperature vacuum bagging and post curing. The resultant edge dam triangle is then removed and cut into a V-shaped edge dam 141 and a straight edge dam 143 for further use.

The composite tape material should be stored in a freezer when not in use and allowed to thaw for two hours before being processed. Referring to FIGS. 1a, 6, 10 and 12–19, the three face body sheets 47, 49 and 51 are cut from the composite tape, and cleaned of dust and debris. The tape sheets are then laid in their proper fiber directional orientations upon the work surface 131 of the lay up tool 111. Suitable tools, such as a putty-type knife and a household-type iron, are used to smooth out any wrinkles and to help increase tackiness of the composite material; the iron heat should be set at acetate (dry heat) and used sparingly. The removable release paper should be left on the outer sides of the completed laminate and marked to indicate the angular direction. A face sheet cutting template is placed onto the laminate and aligned with the zero and 90 degree marks on the tool and laminate. The resultant body face sheet configuration is somewhat triangular with truncated corners such as that shown in FIG. 12.

For each rib A–O (see FIG. 1 9) the rough cut intermediate rib sheets should be cleaned and stacked in the proper fiber orientation upon each other. The putty knife and iron should also be used to smooth out wrinkles and increase tackiness while retaining the release paper. Using various rib cutting templates, the intermediate rib sheets should be cut out from the rough cut laminate stock with curved top and bottom edges. FIG. 14 shows the intermediate sheets of rib G (containing multiple sheets with exemplary fiber orientations of 30/–30/0/90/90/0/–30/30 degree angles), rib J (–30/90/0/90/90/0/90 degrees) and rib M (30/90/0/90/90/0/90 degrees), all cut to 26 inches long. FIG. 15 shows rib A (90/30/–30/0/90/90/0/–30/30 degrees) with the 30 degree side of the laminate contacting against the 90 degree side of the isogrid cell layer, rib C (–30/90/0/90/90/0/90/–30/30 degrees) with the –30 degree side of the laminate contacting against the 30 degree side of the isogrid cell layer, and rib E (30/90/0/90/90/0/90/30/–30 degrees) with the 30 degree side of the laminate contacting against the –30 degree side of the isogrid cell layer, all of which are cut to a length of 31.5 inches. FIG. 16 illustrates rib H (30/–30/0/90/90/0/–30/30 degrees), rib K (–30/90/0/90/90/0/90 degrees), and rib N (30/90/0/90/90/0/90 degrees), all cut to 18 inches long. FIG. 17 shows rib I (30/–30/0/90/90/0/–30/30 degrees), rib L (–30/90/0/90/90/0/90 degrees), and rib O (30/90/0/90/90/0/90 degrees), all cut to a length of 10 inches. Finally, FIG. 18 illustrates rib D (30/–30/0/90/90/0/–30/30/90 degrees) with the 30 degree side of the laminate contacting against a 90 degree side of the isogrid cell layer, rib F (–30/30/90/0/90/90/0/90/30 degrees) with the 30 degree side of the laminate contacting against the –30 degree side of the isogrid cell layer, and rib B (30/30/90/0/90/90/0/90/–30 degrees) with the –30 degree side of the laminate contacting against the 30 degree side of the isogrid cell layer, all of which are cut to a length of 3 inches.

Next, eighteen 0.25 by 0.50 inch laminating reinforcement are cut from the composite material with the 0 degree direction parallel to the 0.50 inch rectangular side. Thirty-two laminating fillers are made by cutting five 4 by 4 inch squares from the composite material which are stacked in the same direction. Using a straight edge, the fillers are cut to about 0.030 inches wide and 4 inches long.

Referring now to FIGS. 1a, 6, 10, 12, 13 and 19–25, the edge dams 141 and 143 are positioned and bolted onto the work surface 131 of the lay up tool 111 adjacent to its periphery. Next, the body face sheet template should be removed from the lay up tool 111. The lay up tool 111 and edge dams 141 and 143 should be treated with the mold release agent. The release paper is then removed from the 90 degree side of the body face sheet laminate and this sheet is placed down onto the work surface 131 of the lay up tool 111 in the same position vacated by the template. The edge dams 141 and 143 serve as a guide such that the body sheet edges should be flush with the edge dams. The putty knife should be used to smooth out the sheets.

After further cleaning, the cut and stacked intermediate rib sheets for ribs C and E should be placed against their appropriate edge dam portions, however, the side of the rib sheet that is immediately adjacent to the corresponding edge dam portion should not yet have its release paper removed. The release paper from the inside surface of each rib C and E should next be peeled back far enough for later insertion of the formed silicone rubber block 221 (see FIG. 25) corresponding with the shape defined by ribs C, D, E and I.

The cut filler should be placed along the bottom edge of each rib and cut to match the length of this silicone rubber block. This filler is used to take up space in the fillet and to help retain the rib to the face sheet.

Figure 19:
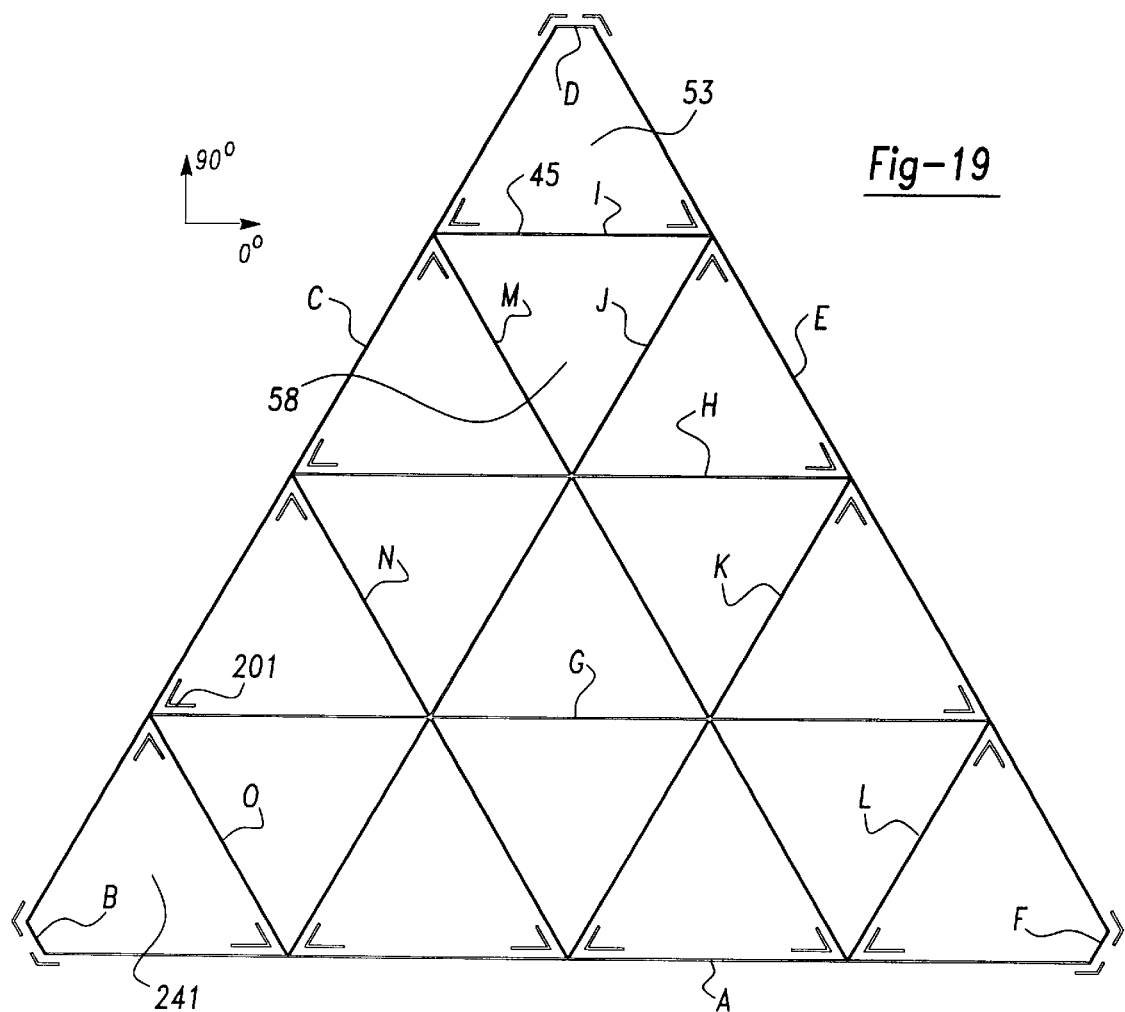
FIG. 19 is a top elevational view showing the quasi-isotropic composite isogrid structure.
Figure 24:
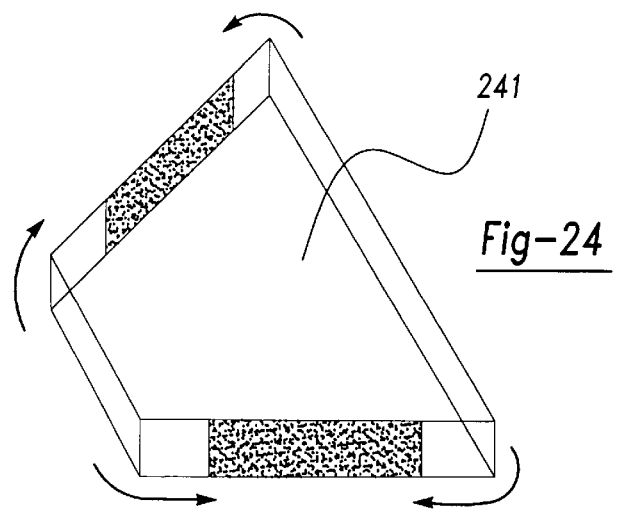
FIG. 24 is a diagrammatic perspective view showing the folding pattern for bottom corner cell layers employed in the quasi-isotropic composite isogrid structure.
Figure 20:
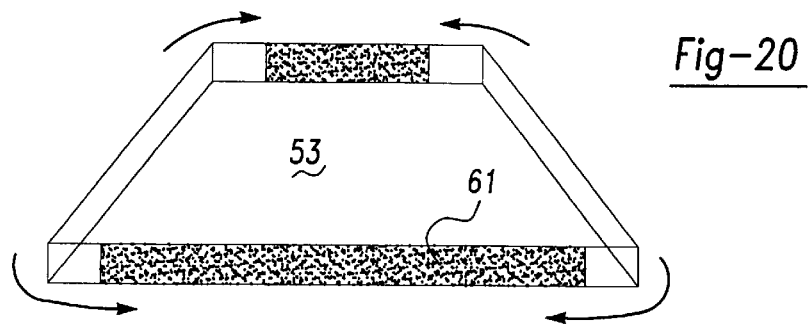
FIG. 20 is a diagrammatic perspective view showing the folding pattern for a top corner cell layer employed in the quasi-isotropic composite isogrid structure.

Prior to installation in the lay up tool, this silicone rubber block 221 is placed on a 4 inch by 4 inch top body sheet 53 (see FIG. 20) with the orientation of the face sheet at 90 degrees. The block is oriented at 0 degrees and should be located in the middle of the square blank. The block and top body sheet 53 are then inverted together and the iron is placed against the release paper for less than five seconds. Thereafter, the block and sheet are returned to the r original position with the release paper side of the top body face sheet touching the table. This top body sheet blank is then folded with portions covering each side of the block. As shown in FIGS. 20 and 25, the vertical rib portions 61 are trimmed flush with the top of the silicone rubber block 221. Intersecting segments of the rib sheet's sections are then cut and folded 30 degrees around the corners in the direction of the arrows. The iron is used to heat and secure the folded edges in place. Next, the release paper is peeled away from the two lower corners of the face sheet 53 with a zero degree ply reinforcement being placed over each corner in an angled manner as shown in FIG. 19. The remaining release paper is then peeled off of the face sheet 53 along the body portion 55. This discarded release paper is placed between the sheet 53 and silicone rubber block 221. This block and top body sheet assembly are then inserted upon the previously laid up body face sheets already stacked upon the lay up tool 111. The block is then used to push the top body sheet up against the outer ribs. The discarded release paper is subsequently removed from the block and the block is manually pressed firmly toward the tool in order to have the body sheets stick together. A strip of filler is next inserted into the fillet gap between the block and sheet 53.

Figure 9A:
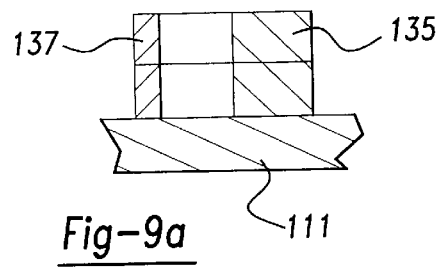
FIG. 9a is a fragmentary cross sectional view, taken along line 9a—9a of FIG. 9, showing the edge dam molds and lay-up tool.
Figure 10:
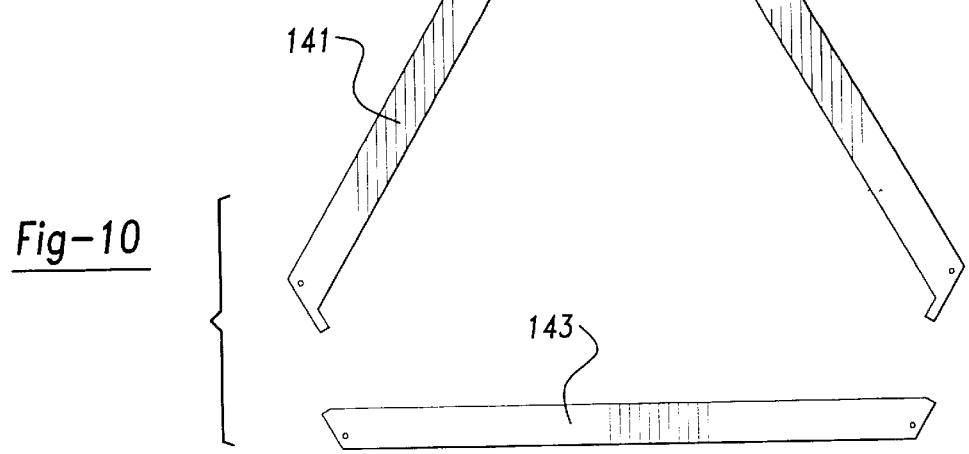
FIG. 10 is a top elevational view showing the edge dams used for making the quasi-isotropic composite isogrid structure.
Figure 11:
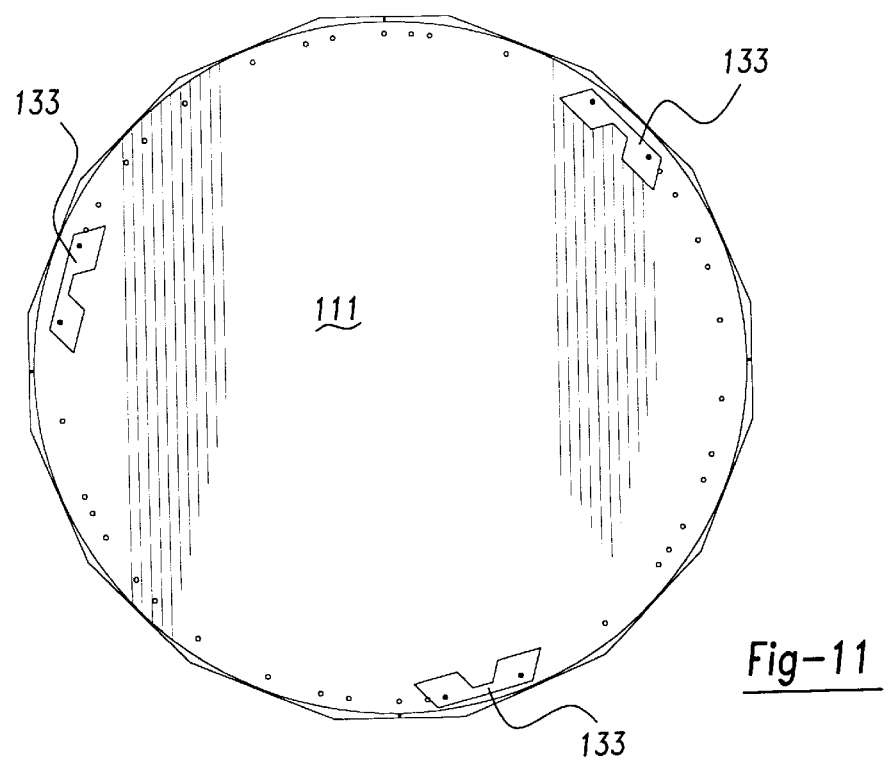
FIG. 11 is a top elevational view showing alignment aids placed on the layup tool used for making the quasi-isotropic composite isogrid structure.
Figure 22:
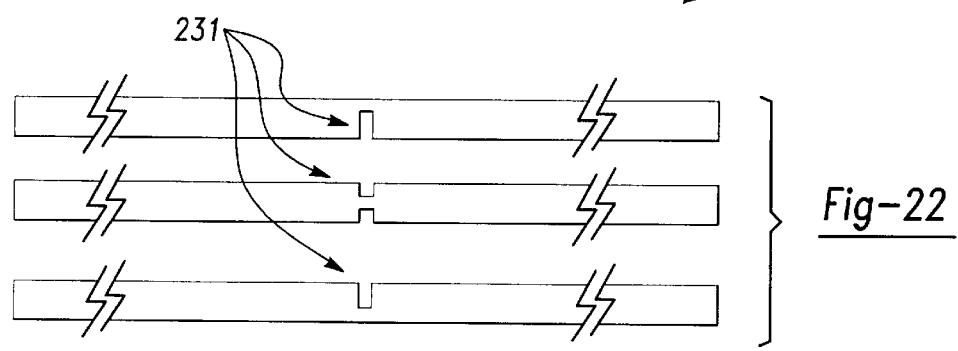
FIG. 22 is a diagrammatic side elevational view showing the notch patterns for internally intersecting ribs employed in the quasi-isotropic composite isogrid structure.
Figure 23:
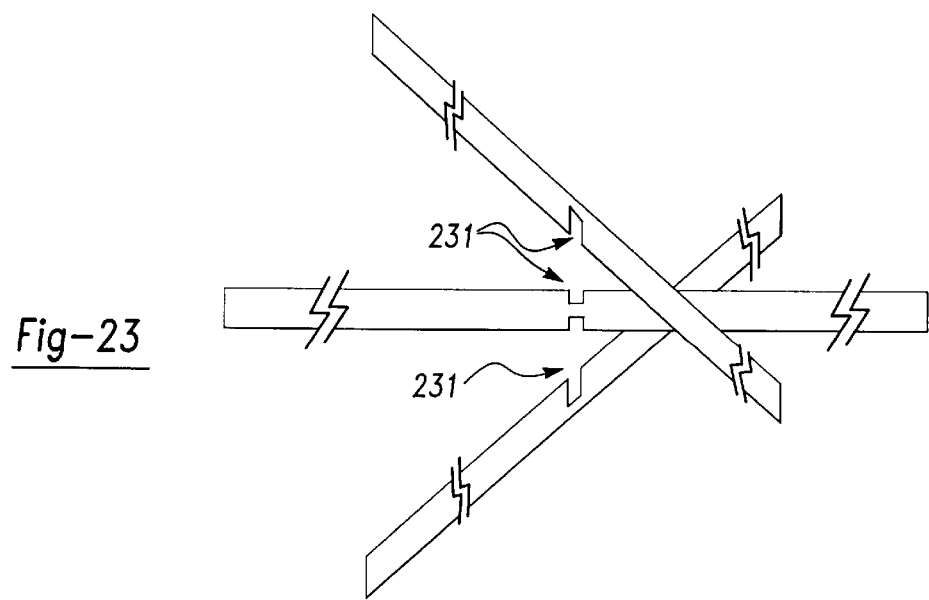
FIG. 23 is an exploded and diagrammatic, perspective view showing the assembly of the internally intersecting ribs employed in the quasi-isotropic composite isogrid structure.

Furthermore, the release paper is removed from the intermediate sheets of the previously stacked rib I and then rib I is inserted as shown in FIG. 1 9. The edges are trimmed to fit flush against the outer ribs C and E. Vertical fillers for the fillets around the vertical corners of the block are then employed. A filler is also installed at the base of each rib. As shown in FIGS. 22 and 23, the notches 231 must be cut and interlocked together at every intersection of the intermediate sheets of ribs J–N. Vertical fillers are installed as needed.

Figure 21:
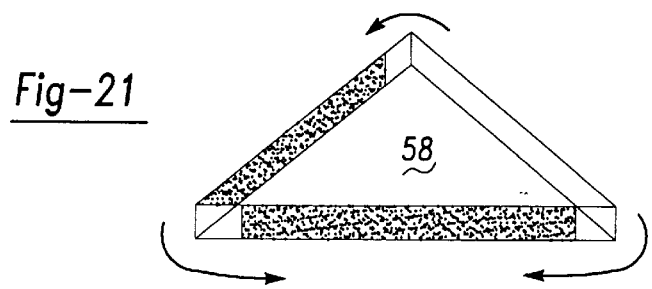
FIG. 21 is a diagrammatic perspective view showing the folding pattern for middle cell layers employed in the quasi-isotropic composite isogrid structure.

The next silicone rubber block corresponding to the body area defined by rib I, J and M is placed on another 4 inch by 4 inch top body sheet blank. This top body sheet blank is oriented at 90 degrees. The block is oriented at 0 degrees. This top body sheet 58 is folded around its silicone rubber block as shown in FIG. 21. Thereafter, it is placed against the previously installed rib I and the body sheets previously placed on the lay up tool 111, as described with face sheet 53. This procedure is duplicated for all of the other remaining upper face sheets and silicone rubber block sections. However, a top body sheet 241 has its corners folded around its corresponding silicone rubber block in the direction of the arrows shown in FIG. 24. The last remaining corner is folded symmetrically opposite.

After complete assembly of the precured isogrid structure 41 on the lay up tool 111, the edge dams 141 and 143 are removed for wrapping of a silicone rubber strip around the entire outer edge of the part. The edge dams 141 and 143 are then bolted back in place on the lay up tool 111.

Referring to FIGS. 25–30, the isogrid structure is prepared for curing. A silicone rubber cover sheet 301 is placed on top of the precured isogrid structure and taped, by way of a metal tape, to the top edge of the edge dams 141 and 143 (see FIG. 10). A piece of perforated release film 303 is then placed on the top of the silicone rubber cover sheet 301. Aluminum tape is used to secure a thermocouple 305 to one of the silicone rubber blocks; the connecting electrical wire 307 is taped to the edge dam 141 and allowed to exit from an oven 309. An N10 breather cloth 311 is wrapped in an overlapping fashion around the lay up tool 111. Also, a vacuum bagging material 313 is wrapped and sealed, by tape or a hot press (using two parallel lines), to fully enclose the tool 111. A vacuum port 315 is allowed access to the vacuum bag 313 adjacent a folded 4 inch by 4 inch additional square of breather cloth.

The thermocouple wire 307 is attached to a thermocouple interface and signal conditioning module which is in turn connected to a volt meter; the vacuum port 315 is coupled to a vacuum pump 321. A vacuum pressure of about 27 inch Hg is applied within 3 minutes, and it has been found that an exemplary smaller sample should be cured according to the heating cycles shown in FIGS. 27 and 28. At the end of the curing cycle, the vacuum pump and oven are turned off; thereafter, the vacuum bag 313 and part are removed from the oven 309.

It is significant that no autoclave is needed since it has been found that the thermal expansion of the silicone rubber blocks is greater than that of the adjacent lay up tool 111 and edge dams 141 and 143. The vacuum pressure acts to constrain and pull the silicone rubber blocks against the tool wherein the thermal expansion differences supply enough pressure to compress the composite sheets together. Of course, an autoclave can be additionally used, although it is not considered necessary.

After oven curing, the lay up tool 111 is removed from the vacuum bag 313. The breather cloth, release paper, silicone cover sheet and thermocouple are all removed. The edge dam and all of the silicone fillers should also be removed. Thereafter, the lay up tool 111 with the cured isogrid structure are placed in the vacuum bag and put into the freezer for about fifteen minutes. A screwdriver should be carefully used to pry out the silicone rubber blocks with the part being continually recooled in the freezer as necessary. Moreover, the cured structure is then removed from the lay up tool 111. Next, a 280 grit sandpaper is employed with a sanding block to wet sand the top edges of the ribs for removal of any excess flash. Similar sanding should be conducted to ensure flushness of the peripheral edges of the face sheets where they meet the outer ribs A–F. A 400 grit sandpaper is subsequently used to wet sand the top edge of the ribs and the peripheral edges of the face sheets. The 400 grit sandpaper is also used to lightly wet sand the smooth bottom surface of the isogrid structure in order to slightly roughen up the surface in preparation for bonding of the mirrors. This also serves to remove any release agent remaining on the part.

Referring now to FIGS. 29–33, 3 mil 0213 microsheet, copper plated, glass mirrors 311 (see FIG. 33) are cleaned using Soft Scrub™ cleaner and rimple cloth and then wiped clean. These glass mirrors are then cut to size in either equilateral triangular or truncated triangular shapes using a padded straight edge and diamond cutter to form templates and then subsequently using the templates to cut the other glass mirrors. Suitable mirrors have been purchased from Optical Coating Laboratory Inc. using Dow Corning No. 0213 microsheet glass.

After cutting, the mirrors are again cleaned and placed in position on a previously cleaned vacuum tool 331. Outer surface of the bottom body face sheet 47 of the isogrid structure 41 is cleaned with isopropyl alcohol, primed with a silicone adhesive primer and then allowed to dry for at least 30 minutes. A silicone adhesive is mixed, degassed and then applied to the primed side of the structure with a plastic spreader. A four inch wide rubber ink roller is then employed to smooth the adhesive layer until a uniform thickness is achieved. The adhesive side of the structure 41 is subsequently placed over the mirrors 311 and pressed into place. Foam spacers are inserted into the isogrid cells and the entire assembly is placed into a vacuum bag. The air is removed from the vacuum bag and the vacuum pressure is maintained until the adhesive is cured; the vacuum pressure for the bag is applied for approximately 2 to 3 minutes and then released. The foam spacers are removed from the structure 41, however, the vacuum pump connected to the vacuum tool 331 is left running for approximately 12 hours.

Finally, A286 stainless steel metal capture cups 341, part of a ball and socket joint for retaining the isogrid structure to a satellite support structure, are adhesively bonded to the corners of the isogrid structure 41. The structure 41 is placed in a plywood jig 343. The top, rib-side of structure 41 is lightly sanded with 220 grit wet-dry sandpaper and then cleaned with alcohol. The flat side of the capture cups 341 are also roughened with 120 grit sandpaper and cleaned. The structure 41 is located within the jig 343 by placing the capture cups 341 on corresponding ball studs 345 and then adjusting the aluminum stops 347. The stops are then fixed to the base of the jig 343. Thereafter, the isogrid structure 41 is removed and a Scotch Weld™ DP-190 epoxy is spread over the flat side of the capture cups 341. The isogrid structure 41 is then laid back upon the jig 343 and small weights are placed on the structure 41 in the location of each capture cup 341. The epoxy must be allowed to cure at room temperature for at least 18 hours before removing the assembly from the jig. A 5 mil thick fiberglass scrim cloth is also used with the Scotch Weld™ epoxy to set a constant bond line thickness.

Figure 34:
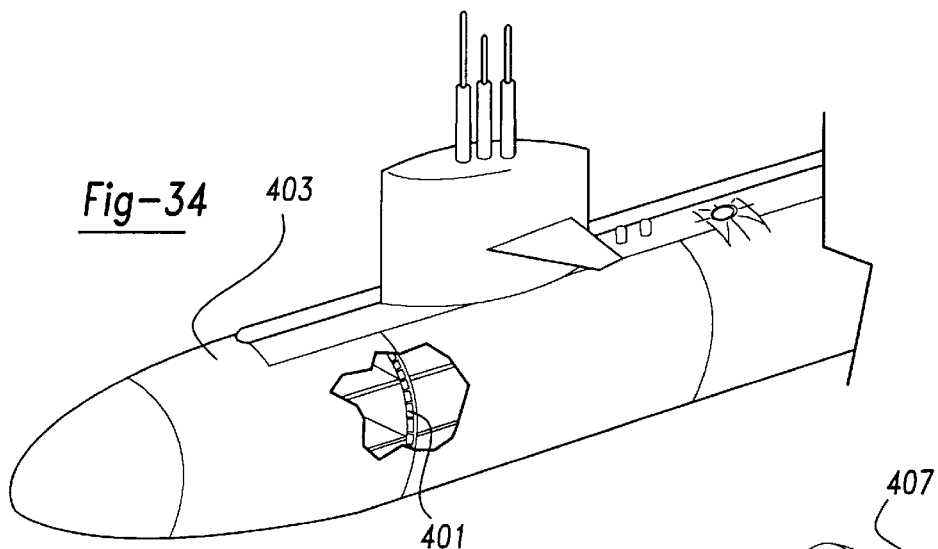
FIG. 34 is a diagrammatic perspective view showing another embodiment of the quasi-isotropic composite isogrid structure employed in a submarine.
Figure 35:
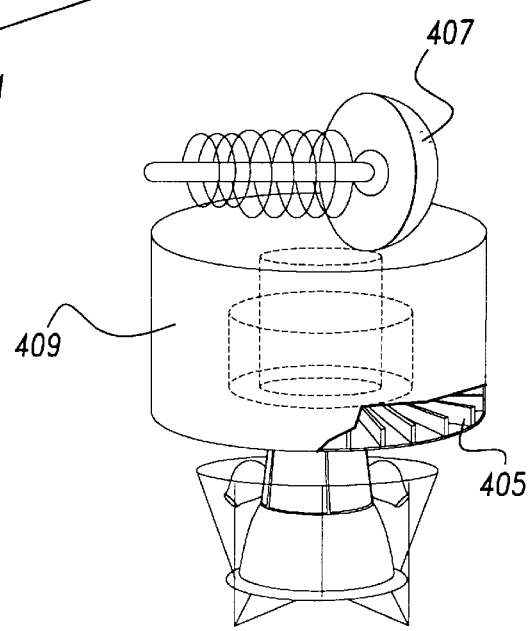
FIG. 35 is a diagrammatic perspective view showing another embodiment of the quasi-isotropic composite isogrid structure employed in a satellite.
Figure 36:
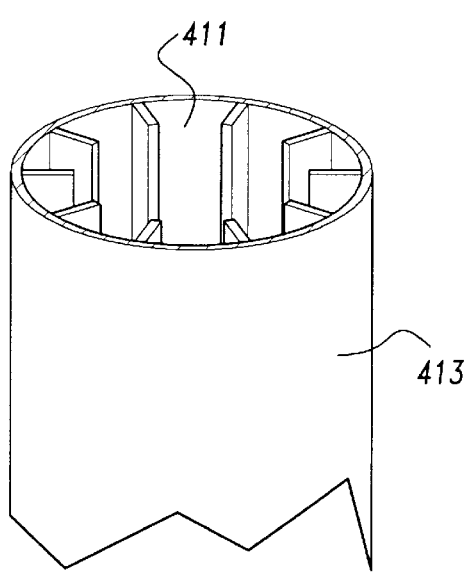
FIG. 36 is a diagrammatic and fragmentary perspective view showing another embodiment of the quasi-isotropic composite isogrid structure employed in a propellant tank.
Figure 37:
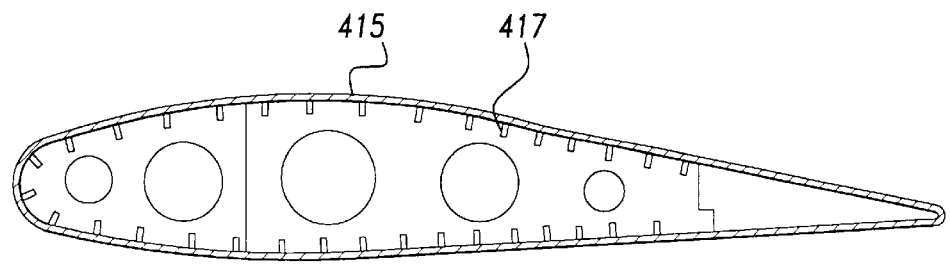
FIG. 37 is a diagrammatic cross sectional view showing another embodiment of the quasi-isotropic composite isogrid structure employed in an aircraft wing.

While an embodiment of the mirror facet quasi-isotropic composite isogrid structure has been disclosed, it will be appreciated that various other embodiments may be employed. For example, FIG. 34 shows a quasi-isotropic composite isogrid structure 401 employed as a structural bulkhead within a submarine 403. Similarly, another embodiment of the present invention provides for the use of a quasi-isotropic composite isogrid structure as a structural platform 405 or as an antenna dish 407 in a satellite 409, as shown in FIG. 35. FIG. 36 discloses the use of a cylindrical quasi-isotropic composite isogrid structure employed as an inner wall or outer wall 411 of a propellant tank 413. Finally, as shown in FIG. 37, an airplane wing 415 may also employ a quasi-isotropic composite isogrid structure 417 of the present invention wherein ribs all project generally perpendicular to the body surface. It is also envisioned that more or less body and rib sheets may be provided with the present invention. Various materials, angles and dimensions have been disclosed in an exemplary fashion, however, other materials, angles and dimensions may of course be employed. It is intended by the following claims to cover these and any other departures from the disclosed embodiments which fall within the true spirit of this invention.

What is claimed is:

1. A composite structure comprising:

a body;

a rib extending generally perpendicular to said body;

said body including:

a first body sheet of composite material having substantially unidirectional fibers extending at an angle of about 90 degrees relative to a reference sheeting direction;

a second body sheet of composite material having substantially unidirectional fibers extending at an angle of about 0 degrees relative to said reference sheeting direction;

a third body sheet of composite material having substantially unidirectional fibers extending at an angle of about 90 degrees relative to said reference sheeting direction, said second body sheet being sandwiched between said first and third body sheets;

said rib including:

a first rib sheet placed against said second body sheet so as to extend generally perpendicularly therefrom, said first rib sheet being formed of a composite material having substantially unidirectional fibers extending at an angle of about 90 degrees relative to said reference sheeting direction;

a second rib sheet disposed against said first rib sheet and being formed of a composite material having substantially unidirectional fibers extending at an angle of about 0 degrees relative to said reference sheeting direction;

a third rib sheet disposed against said second rib sheet and being formed of a composite material having substantially unidirectional fibers extending at an angle of between about 0 degrees and −90 degrees relative to said reference sheeting direction;

a fourth rib sheet disposed against said third rib sheet and being formed of a composite material having substantially unidirectional fibers extending at an angle of between about 0 degrees and 90 degrees relative to said reference sheeting direction; and said first body sheet having a first portion extending parallel to said reference sheeting direction and a second portion extending perpendicular to said first portion, said second portion being disposed against one of said rib sheets to form an outer surface therefor.

2. The composite structure of claim 1, wherein said rib further comprises:

a pair of said second rib sheets, with one of each of said pair of second rib sheets being disposed on opposite sides of said first rib sheet.

3. The composite structure of claim 1, wherein said rib further comprises:

a pair of said second rib sheets, with one of each of said pair of second rib sheets being disposed on opposite sides of said first rib sheet;

a pair of said third rib sheets, with one of each of said pair of third rib sheets being disposed on opposite sides of said first rib sheet; and a pair of said fourth rib sheets, with one of each of said pair of fourth rib sheets being disposed on opposite sides of said first rib sheet.

4. A method of making a composite structure having a body and a rib, said method comprising the steps of:

(a) laying a first sheet of composite material against a work surface of a tool and orienting substantially unidirectional fibers of the first sheet in a first direction defining an angle of about 0° relative to a reference sheeting direction as part of the body;

(b) laying a second sheet of composite material upon the first sheet, opposite the tool, and orienting substantially unidirectional fibers of the second sheet at an angle of approximately 90° to said sheeting direction;

(c) laying at least a third sheet of composite material upon the second sheet, opposite the first sheet as part of the body;

(d) laying a first portion of a fourth sheet of composite material upon the at least a third sheet as part of the body, said forth sheet having substantially unidirectional fibers orientated at an angle of about 0° relative to said reference sheeting direction;

(e) curving the body;

(f) positioning at least one first rib sheet against the body, said first rib sheet having fibers orientated at an angle of generally about 90° to said reference sheeting direction;

positioning at least one second rib sheet against the body, said second rib sheet having fibers orientated at an angle of about 0° relative to said reference sheeting direction;

positioning at least one third rib sheet against the body, said third rib sheet having fibers orientated at an angle between 0° and 90°, relative to said reference sheeting direction;

positioning at least one fourth rib sheet against the body, said fourth rib sheet having fibers orientated at an angle of between 0° and −90°;

(g) bending a second portion of the fourth sheet, relative to the first portion, while maintaining the first and second portions of the fourth sheet as an unsevered sheet;

(h) laying the second portion of the fourth sheet directly against the rib sheet in a parallel manner such that at least the second portion of the fourth sheet and the first, second and third rib sheets define the rib extending from the body; and (i) curing the structure, thereby permanently securing the sheets together and the rib to the body.

5. The method of claim 4, further comprising the steps of positioning at least a majority of the first rib sheet in at least one straight line and sanding a tool-side surface of the first sheet after removal of the body from the tool.

6. The method of claim 4, further comprising the steps of:

(a) positioning an edge of another rib sheet against the body at a location spaced apart from said rib;

(b) bending a third portion of the fourth sheet relative to the first portion; and (c) laying the third portion of the fourth sheet against said another rib sheet in a parallel manner such that at least the third portion of the fourth sheet and the second rib sheet define a second rib extending from the body.

7. The method of claim 4, further comprising the steps of:

positioning second ones of said second, third and fourth ribs sheets against said body such that said second rib sheets are disposed on opposite sides of said first rib sheet, said third rib sheets are disposed on opposite sides of said first rib sheet, and said fourth rib sheets are disposed on opposite sides of said first rib sheet.

8. A method of making a composite structure comprising the steps of:

(a) laying a first sheet of composite material against a work face of a tool;

(b) laying at least one second sheet of composite material on top of the first sheet;

(c) wrapping a third sheet of composite material around at least a section of a rigid block;

(d) placing a bottom surface of the third sheet against an adjacent surface of the at least one second sheet, opposite the first sheet;

(e) heating the sheets and the block in an oven;

(f) expanding the block an amount greater than the expansion of the tool;

(g) compressing at least portions of the sheets between the block and the tool in response to step (f); and (h) curing the sheets in the oven.

9. The method of claim 8 further comprising the steps of:

(a) positioning at least one of the sheets with its fibers being oriented in a first direction; and (b) positioning at least another of the sheets with its fibers being oriented in a second direction different than the first direction.

10. The method of claim 8 further comprising the steps of:

(a) providing a leg of the tool upstanding from the work face of the tool;

(b) positioning rib sheets between a wrapped side portion of the third sheet and the leg of the tool; and (c) compressing the rib sheets and the wrapped side portion of the third sheet between the block and the leg of the tool when the block is heated and expanded in the oven.

11. The method of claim 8 further comprising the steps of:

(a) wrapping a fourth sheet of composite material around at least a section of a second rigid block;

(b) positioning at least a fifth sheet between side portions of the third and fourth sheets and between the blocks; and (c) compressing the fifth sheet and the side portions of the third and fourth sheets between the blocks when the blocks are heated and expanded in the oven.

12. The method of claim 8 further comprising the step of applying a vacuum to the sheets and the block during heating in the oven.

* * * * *

UNITED STATES PATENT AND TRADEMARK OFFICE
CERTIFICATE OF CORRECTION

PATENT NO. : 6,007,894
DATED : December 28, 1999
INVENTOR(S) : Barnes et al

It is certified that error appears in the above-identified patent and that said Letters Patent is hereby corrected as shown below:

On the title page assignee "McDonnell Dougal" should be -- McDonnell Douglas --.

Column 2, Line 63, "an" should be -- and --.

Column 3, Line 34, "if" should be -- of --.

Column 7, Line 35, "(30/30/90/0/90/90/0/90/-30)" should be

-- (30/-30/90/0/90/90/0/90/-30) --.

Column 8, Line 12, "the r" should be -- their --.

Column 12, line 8, "forth" should be -- fourth --.

Column 12, line 55, "ribs" should be -- rib --.

Signed and Sealed this

Twenty-first Day of November, 2000

Attest:

Q. TODD DICKINSON

*Attesting Officer*  *Director of Patents and Trademarks*